United States Patent [19]

Malhotra

[11] Patent Number: 5,793,003
[45] Date of Patent: Aug. 11, 1998

[54] ADVANCED SOUND REDUCTION TAPE

[75] Inventor: Kiran Malhotra, Cumberland, R.I.

[73] Assignee: Plymouth Rubber Company, Canton, Mass.

[21] Appl. No.: 838,563

[22] Filed: Apr. 9, 1997

Related U.S. Application Data

[60] Provisional application No. 60/014,919 Apr. 10, 1996.

[51] Int. Cl.$^6$ .............................. F16F 7/00; B62D 33/00; B32B 7/12
[52] U.S. Cl. .............................. 181/207; 296/39.3; 428/343
[58] Field of Search .............................. 181/207, 208, 181/209, 286, 294; 296/39.3; 428/338, 339, 343, 349, 353

[56] References Cited

U.S. PATENT DOCUMENTS

| | | | |
|---|---|---|---|
| 2,355,568 | 8/1944 | Smith | 181/208 |
| 3,193,049 | 7/1965 | Wollek | 181/207 |
| 3,205,972 | 9/1965 | Stricker et al. | 181/208 |
| 3,386,527 | 6/1968 | Daubert et al. | 181/208 |
| 3,457,919 | 7/1969 | Harbard . | |
| 4,367,511 | 1/1983 | Crass et al. . | |
| 4,397,905 | 8/1983 | Dettmer et al. . | |
| 4,546,029 | 10/1985 | Cancio et al. . | |
| 5,344,693 | 9/1994 | Sanders . | |
| 5,690,035 | 11/1997 | Hatayama et al. | 296/39.3 |
| 5,698,477 | 12/1997 | Iwamaru | 428/343 |

*Primary Examiner*—Khanh Dang
*Attorney, Agent, or Firm*—Weingarten, Schurgin, Gagnebin & Hayes LLP

[57] ABSTRACT

An advanced sound reducing tape includes a surface treatment which results is reduced noise when the surface treatment comes into contact with various materials. The surface treatment comprises an arrangement of ridges and depressions disposed across a surface of the tape. The tape is vinyl based and therefore low in cost while providing a similar noise reduction as convention cloth tapes. The tape is typically utilized on a harness within an automobile and reduces squeaks when the harness including the tape comes into contact with interior portions of the vehicle which are typically polypropylene, ABS plastic or steel.

15 Claims, 2 Drawing Sheets

ADVANCED SOUND REDUCTION TAPE

CROSS REFERENCE TO RELATED APPLICATIONS

This application claims priority under 35 U.S.C. § 119(e) to provisional application Ser. No. 60/014,919 filed on Apr. 10, 1996.

STATEMENT REGARDING FEDERALLY SPONSORED RESEARCH OR DEVELOPMENT

Not applicable

BACKGROUND OF THE INVENTION

Tape is used in applications such as part of a wiring harness for an automobile. Ideally, the tape produces no sound when rubbed against various surfaces with which the wiring harness including the tape may come into contact. Typically cloth tape has been utilized which, while providing an acceptable level of sound which is below the level of human hearing when frictionally contacting other surfaces, is relatively expensive when compared to vinyl tapes. Vinyl tapes have been utilized which include a variety of surface finishes such as a smooth surface finish, a satin surface finish, a dull surface finish and a micro surface finish; however all of these vinyl tapes, while being lower in cost than cloth tape, produce unacceptable levels of noise when frictionally contacting various surfaces of a vehicle.

BRIEF SUMMARY OF THE INVENTION

The invention relates to an advanced sound reduction tape or anti-squeak and rattle (ASR) tape which produces a low level of sound when the tape is rubbed against another material or itself. The tape includes a surface treatment which provides for the reduce level of sound when the tape is brought into frictional contact with other materials. The tape is typically utilized as part of a wire harness within an automobile. The tape provides the noise reduction required at a low cost.

BRIEF DESCRIPTION OF THE SEVERAL VIEWS OF THE DRAWING

The invention will be more fully understood from the following detailed description taken in conjunction with the accompanying drawings of the invention in which.

DETAILED DESCRIPTION OF THE INVENTION

An advanced sound reduction or anti-squeak and rattle (ASR) tape is disclosed. In the preferred embodiment the ASR tape is vinyl based, though other materials such as plastic based materials or rubber based materials could also be implemented. The ASR tape includes a surface treatment which provides for reduced sound when the surface of the tape is rubbed against a material.

Figure 1:
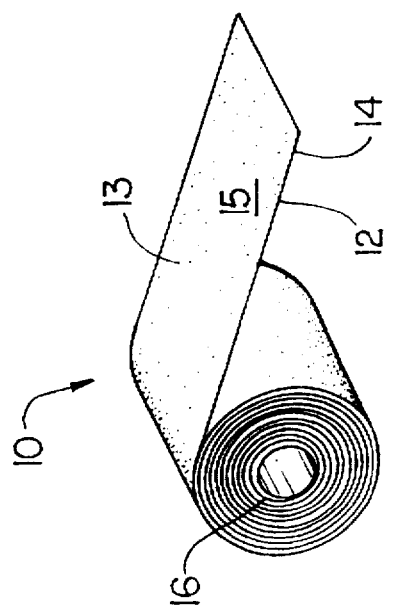
FIG. 1 is an isometric view of the ASR tape of the present invention.

Referring now to FIG. 1 an isometric view of the ASR tape 10 wound on a roll 16 is shown. The ASR tape 10 includes a substrate 12 of, for example, polyvinyl chloride or polyolefins and has a top surface 13 and a bottom surface 14. The top surface 13 has been treated by having its surface embossed in a certain pattern 15 (called Doeskin) which substantially reduces the noise produced when the top surface 13 of the ASR tape 10 comes into contact with various materials. The bottom surface 14 has been provided with a pressure sensitive adhesive, such that the tape 10 can be installed onto various items, for example a wire harness of an automobile, and remain affixed thereto. Other types of adhesives can be used.

Figure 3:
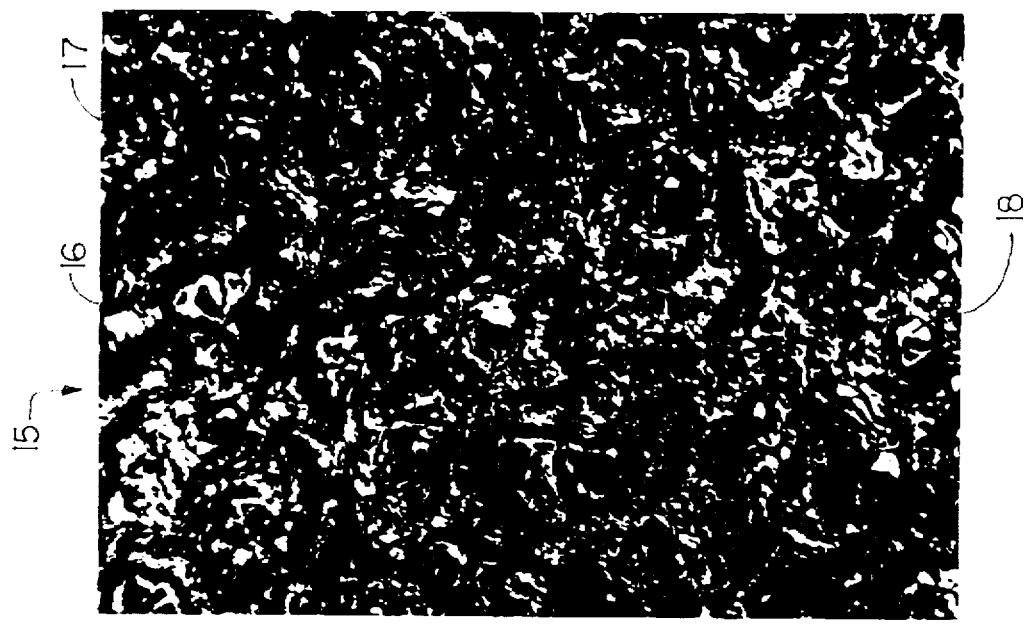
FIG. 3 is a photomicrograph of the surface treatment of the ASR tape at 63 times magnification.
Figure 2:
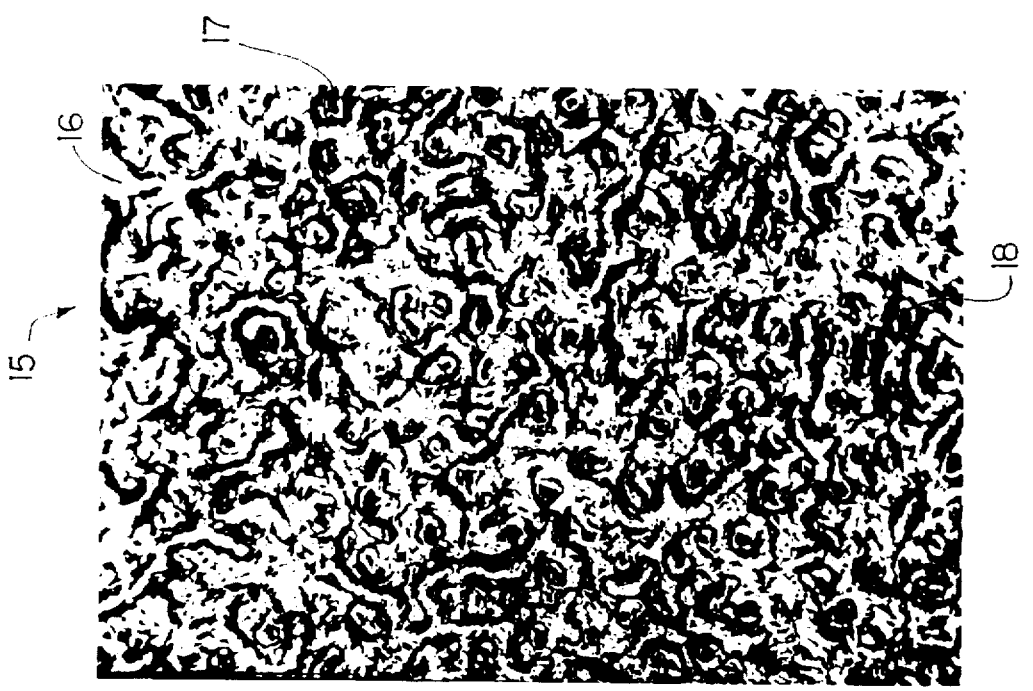
FIG. 2 is a photomicrograph of the surface treatment of the ASR tape at 30 times magnification.

Referring now to FIG. 2 which is a photomicrograph showing the surface treatment 15 magnified thirty times, and to FIG. 3 which is a photomicrograph showing the surface treatment 15 magnified sixty three times, the surface treatment 15 shown comprises a pattern of ridges 16, 18 and valleys 17. The ridges are generally of two types, one type of ridge 16 being sinuous or meandering and extending continuously for a length. These extended ridges 16 may have numerous reverse curves. A second type of ridge 18 is generally circular and has an indentation or depression in the upper surface. The valleys 17 surround the ridges 16 and 18 and may be correspondingly sinuous or meandering and extend generally along the length of the extending ridges 16 or may be generally circular and extend around the generally circular ridges 18. The surface treatment 15 is configured such that it covers the entire top surface 13 of the tape 10. The tape is embossed by being fed through a roller which has a surface corresponding to the surface treatment 15 described above.

The ASR tape 10 is able to provide the noise reduction characteristics of cloth tape at a significantly reduced cost relative to cloth based tapes. The ASR tape 10 can be easily manufactured in various widths and lengths and, like conventional tapes, can be wound on rolls. The ASR tape 10 can also be customized in terms of unwind, roll size, gauge and color. The ASR tape 10 is durable and should easily last the life of the vehicle that it is installed in, while also providing the temperature and chemical resistance of vinyl based tapes.

A number of tests, described below, were done on various prior art tapes having surface treatments such as Smooth finish vinyl tape, Micro finish vinyl tape, and Satin finish vinyl tape all available from Plymouth Rubber Company of Canton, Mass. and Cloth tape available from Kendall Corporation of Lexington, Mass. Three methods of testing the ASR tape 10 against the prior art tapes were performed. The first method, known as the Material Itch Noise Impulse Test for linear sliding (MINIT) measures the sound generated when a test sample of the tape is rubbed against a substrate under a load of 2.5 pounds on a two inch square substrate. The sound produced is measured by the Zwicker method in linear units known as Sones, and the noise ratio versus cloth tape is also in units measured by the Zwicker method in sones (N20 statistics). The results are listed below in table 1.

TABLE 1

| Sample Description | Substrate | Noise Ratio vs. Cloth Tape |
|---|---|---|
| Smooth Finish Vinyl Tape | ABS | 5.6 |
| Micro Finish Vinyl Tape | ABS | 3.8 |
| Satin Finish Vinyl Tape | ABS | 2.2 |
| Doeskin ASR Vinyl Tape | ABS | 1.8 |
| Cloth Tape (Polyken 165) | ABS | 1.0 |

The sound data has been normalized to cloth tape as 1.0, since cloth tape has been the industry standard for these type of applications. As can be seen from Table 1, the Doeskin ASR tape produces a noise level of 1.8 as compared to the cloth tape. The noise level of the Doeskin ASR tape is below that of the Satin Finish vinyl tape and well below that of the Micro finish vinyl tape and the Smooth finish vinyl tape, while only slightly above the cloth tape.

A second method of testing the sound produced by tape is known as the National Technical Systems (NTS) Test Method. This method measures the sound generated when a sample of the tape is vibrated against a substrate under a load of three pounds on a two inch by four inch surface. The sound measured is in decibels (dba). The noise ratio versus cloth tape is as also in dba, and is the ratio average of ten samples. The results from this test are shown below in table 2.

TABLE 2

| Sample Description | Substrate | Noise Ratio vs. Cloth Tape |
|---|---|---|
| Smooth Finish Vinyl Tape | ABS | 1.17 |
| Dull Finish Vinyl Tape | ABS | 1.29 |
| Doeskin ASR Vinyl Tape | ABS | 1.04 |
| Cloth (Polyken 165) | ABS | 1.0 |

This test indicates that the Doeskin ASR vinyl tape produces sound well below the smooth finish vinyl tape and the dull finish vinyl tape, while producing sound only slightly louder than the cloth tape.

A third test was done similar to the NTS described above; however in this set of tests, the tape was rubbed against a sample of itself. The results from this test are shown below in table 3

TABLE 3

| Sample Description | Noise Ratio vs. Cloth tape |
|---|---|
| Smooth Finish Vinyl Tape | 1.15 |
| Dull Finish Vinyl Tape | 1.19 |
| Doeskin ASR Vinyl Tape | 0.94 |
| Cloth (Polyken 165) | 1.0 |

Table 3 shows that when the tape sample is rubbed against itself, the noise ratio for the ASR tape is less than the smooth vinyl tape and the dull finish vinyl tape as well as being below the cloth tape.

Figure 4:
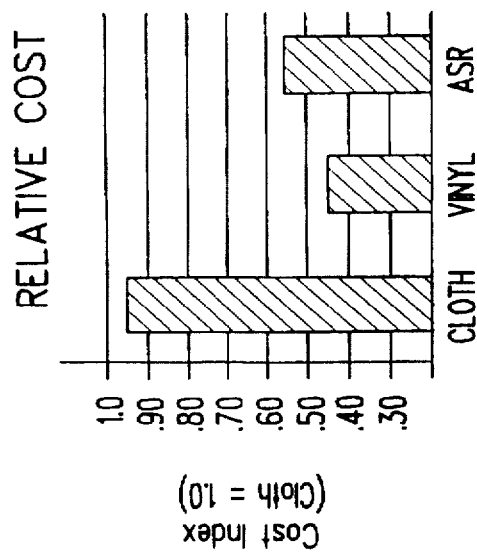
FIG. 4 is a graph of the cost of the ASR tape compared to other tapes.

Referring now to FIG. 4, a graph is shown which compares the relative cost of conventional cloth tape, conventional vinyl tape and ASR tape. The cost has been normalized to the cost of cloth tape. Conventional vinyl tape has a relative cost of approximately fifty percent the cost of cloth tape. The ASR tape, while slightly more expensive than the conventional vinyl tape, is still well below the cost of cloth tape, at approximately sixty percent the cost of cloth tape.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

I claim:

1. An advanced sound reduction tape comprising:

a substrate having a first surface and a second surface;

a surface treatment provided on the first surface of said substrate for providing a reduced level of sound when said first surface of said tape frictionally contacts a material, said surface treatment comprising a pattern of ridges and valleys, the ridges including generally sinuous or meandering ridges which extending continuously for a length and further including generally circular ridges having a depression in an upper surface, the valleys surrounding and extending along the length of the extending ridges; and an adhesive applied on the second surface of said substrate.

2. The advanced sound reduction tape of claim 1 wherein said substrate comprises vinyl.

3. The advanced sound reduction tape of claim 2 wherein said substrate comprises polyvinyl chloride.

4. The advanced sound reduction tape of claim 1 wherein said substrate comprises polyolefin.

5. The advanced sound reduction tape of claim 1 wherein said substrate comprises a rubber based material.

6. The advanced sound reduction tape of claim 1 wherein said substrate comprises a plastic based material.

7. The advanced sound reduction tape of claim 1 wherein said surface treatment is preselected to produce a level of sound by rubbing said tape against a material that is less than approximately five decibels.

8. The advanced sound reduction tape of claim 1 wherein said tape is wound on a roll.

9. The advanced sound reduction tape of claim 1 wherein said surface treatment is preselected to produce a level of sound by rubbing said tape against an ABS substrate under a load of approximately two and one half pounds that is approximately 1.8 times a level of sound produced when a cloth tape is rubbed against an ABS substrate under a load of approximately two and one half pounds.

10. The advanced sound reduction tape of claim 1 wherein said surface treatment is preselected to produce a level of sound by rubbing said tape against an ABS substrate under a load of approximately three pounds that is approximately 1.04 times a level of a sound produced when a cloth tape is rubbed against an ABS substrate under a load of approximately three pounds.

11. The advanced sound reduction tape of claim 1 wherein a level of a sound produced when a first piece of said advanced sound reduction tape is rubbed against a second piece of said advanced sound reduction tape is approximately 0.94 times a level of sound produced when a first piece of cloth tape is rubbed against a second piece of cloth tape.

12. An advanced sound reduction tape comprising:

a substrate having a first surface and a second surface, and a surface treatment provided on the first surface of said substrate for providing a reduced level of sound when said first surface of said tape frictionally contacts a material, said surface treatment comprising a pattern of ridges and valleys, the ridges including generally sinuous or meandering ridges which extending continuously for a length and further including generally circular ridges having a depression in an upper surface, the valleys surrounding and extending along the length of the extending ridges.

13. The advanced sound reduction tape of claim 1 wherein said substrate comprises vinyl.

14. The advanced sound reduction tape of claim 1 wherein said substrate comprises a plastic based material.

15. The advanced sound reduction tape of claim 1 wherein said surface treatment is preselected to produce a level of sound by rubbing said tape against a material that is less than approximately five decibels.

* * * * *